(12) United States Patent
Kim et al.

(10) Patent No.: US 11,003,173 B2
(45) Date of Patent: May 11, 2021

(54) IDENTIFIER (ID) BASED COMMUNICATION SYSTEM

(71) Applicant: TSC INC., Hwaseong-si (KR)

(72) Inventors: Oh Su Kim, Suwon-si (KR); Byeong-Ho Kwon, Hwaseong-si (KR); Sun Il Park, Suwon-si (KR); John Ho Kuk, Osan-si (KR); Sun Tai Park, Daejeon (KR); Dae Kuk Kim, Hwaseong-si (KR)

(73) Assignee: TSC INC., Hwaseong-si (KR)

( * ) Notice: Subject to any disclaimer, the term of this patent is extended or adjusted under 35 U.S.C. 154(b) by 55 days.

(21) Appl. No.: 16/699,271

(22) Filed: Nov. 29, 2019

(65) Prior Publication Data
US 2020/0174454 A1    Jun. 4, 2020

(30) Foreign Application Priority Data
Nov. 30, 2018    (KR) .......................... 10-2018-0152604

(51) Int. Cl.
*G05B 19/41* (2006.01)
*G06F 13/40* (2006.01)
*G05B 19/418* (2006.01)

(52) U.S. Cl.
CPC ..... *G05B 19/4185* (2013.01); *G06F 13/4027* (2013.01); *G05B 2219/31088* (2013.01)

(58) Field of Classification Search
None
See application file for complete search history.

(56) References Cited

U.S. PATENT DOCUMENTS

| | | | | |
|---|---|---|---|---|
| 5,461,608 A | * | 10/1995 | Yoshiyama | ............. H04L 43/00 370/222 |
| 2007/0050226 A1 | * | 3/2007 | Iga | ..................... G06Q 10/0631 705/7.12 |

(Continued)

*Primary Examiner* — Philip Wang
(74) *Attorney, Agent, or Firm* — Finch & Maloney, PLLC; Jay S. Franklin

(57) ABSTRACT

Disclosed herein is an identifier based communication system including: a common communication path; a center station having a center station communication module and a center station controller connected to the center station communication module and connected to the common communication path through the center station communication module; and a plurality of distribution stations each including a distribution station communication module connected to the common communication path, a distribution station controller connected to the distribution station communication module, and a distribution station memory connected to the distribution station controller and storing a determined identifier value of the distribution station, wherein the center station controller transmits an identifier setting mode command including a center transmission preliminary identifier value to the distribution stations following an identifier setting request input from the outside; each of the distribution stations includes a distribution station display displaying information on the identifier value and an identifier selection key operated to select the preliminary identifier value displayed on the distribution station display as the determined identifier value of the distribution station; and wherein in a state where either a next preliminary identifier value of the setting mode or the center transmission preliminary identifier value is displayed on a corresponding distribution station display of each distribution, when a corresponding identifier selection key of each distribution station is operated to be on, the distribution station controller (Continued)

stores the preliminary identifier value displayed on the corresponding distribution station display in a corresponding distribution station memory of the distribution station as a determined identifier value of the setting mode of the distribution station, the distribution station controller displays the corresponding determined identifier of the setting mode on the corresponding distribution station display in a form different from the preliminary identifier value of the setting mode, the distribution station controller stores the corresponding determined identifier of the setting mode in the corresponding distribution station memory, and then transmits to other distribution station, a next preliminary identifier value of the setting mode, which is a value increased by the number N (positive integer) from the corresponding determined identifier value of the setting mode, the distribution station controller displays the center transmission preliminary identifier value received from the center station on the corresponding distribution station display after receiving the identifier setting mode command from the center station and until the distribution station controller receives the next preliminary identifier value of the setting mode from the other distribution station, and the distribution station controller sequentially displays the next preliminary identifier value of the setting mode received from the other distribution station on the corresponding distribution station display before the corresponding determined identifier of the setting mode is stored in the corresponding distribution station memory. In this manner, the identifier (ID) based communication system in the disclosure allows the user to easily select the determined identifier value of the distribution station as needed, has a simple configuration of the common communication path, and allows the user to easily visually confirm the determined identifier value of each distribution station.

3 Claims, 19 Drawing Sheets

(56) References Cited

U.S. PATENT DOCUMENTS

| | | | | |
|---|---|---|---|---|
| 2014/0293871 | A1* | 10/2014 | Jung | H04W 40/20 |
| | | | | 370/328 |
| 2016/0165648 | A1* | 6/2016 | Kawashima | H04W 40/22 |
| | | | | 455/450 |
| 2016/0218985 | A1* | 7/2016 | Kim | H04L 47/30 |
| 2018/0083938 | A1* | 3/2018 | Kim | H04L 9/0861 |
| 2018/0288075 | A1* | 10/2018 | Yamane | H04L 43/04 |
| 2018/0375721 | A1* | 12/2018 | Rondeau | H04L 61/2038 |
| 2020/0174454 | A1* | 6/2020 | Kim | G05B 19/4185 |
| 2020/0177301 | A1* | 6/2020 | Kwak | H04L 67/12 |

* cited by examiner

IDENTIFIER (ID) BASED COMMUNICATION SYSTEM

BACKGROUND

Field

The disclosure relates to an identifier (ID) based communication system, and more particularly, to a communication system assigning a unique identifier to each device having a communication module and selecting a communication counterpart based on the assigned identifier to exchange data.

Description of the Related Art

A communication path may be necessary to exchange data between devices with communication modules (hereinafter, "stations"). In case that there are a plurality of stations, the stations may use a common communication path (such as RS 485 BUS) having a configuration to connect all stations to each other in common for efficient use of the communication path.

The common communication path may assign a unique identifier (ID) to a station connected to each node of the common communication path to specify a counterpart to transmit data. Hereinafter, in the disclosure, a station to control an identifier assignment operation may be referred to as a center station, and the remaining stations may be referred to as distribution stations, respectively. In case that a distribution station having an assigned identifier acts as a slave, the distribution station may respond to a communication request if an identifier value sent by the center station (master) matches a determined identifier value thereof and may not respond otherwise.

An identifier of each distribution station may not only be assigned when the system is newly established but may also be reassigned or modified in case that more distribution stations are established or at least one of the distribution stations are replaced after being operated in a normal mode (i.e. a mode of performing a unique function of the distribution station, for example, a mode in which the center station requests the distribution station to transmit thereto data such as a temperature measurement value and in response, the distribution station transmits the data to the center station).

FIG. 18 is a functional block diagram of a conventional identifier based communication system.

The conventional identifier based communication system, as illustrated in FIG. 18, may have a common communication path 111, a center station 120 and a distribution station 130, which are connected to the common communication path 111.

The common communication path 111 may be implemented using RS 485 BUS or the like.

In addition, an on-off switch 111a may be installed in the common communication path 111.

Each on-off switch 11a may be installed one by one behind a point where a distribution station controller 132 is connected to the common communication path 111.

Each on-off switch 111a may be electronically turned on and off by a corresponding distribution station controller 132.

The center station 120 may have a center station controller 122.

Each distribution station 130 may have the distribution station controller 132 and a distribution station memory 133 which is connected to the distribution station controller 132.

Referring to FIG. 19, the following is a method of setting an identifier value used in the conventional identifier based communication system having the above described configuration. For convenience of description, the distribution stations may be distinguished from each other such as a first distribution station, a second distribution station and a third distribution station in an order adjacent to the center station 120. In addition, each on-off switch 111a is assumed to be turned on.

First, the center station controller 122 may assign a temporary identifier value which is common to each distribution station 130.

Next, the center station controller 122 may request each distribution station 130 to turn off the on-off switch 111a using the temporary identifier value.

Each distribution station controller 132 may then turn off the on-off switch 111a corresponding thereto. In a state in which each on-off switch 111a is turned off, only the first distribution station may be connected to the center station 120 and the other distribution stations may be disconnected from the center station 120.

Next, the center station controller 122 may transmit one first determined identifier value.

The first distribution station may then receive the first determined identifier value and store the value in the distribution station memory 133.

Next, the center station 120 may request the first distribution station to turn on the on-off switch 111a using the first determined identifier value.

A distribution station controller belonging to the first distribution station may then turn on an on-off switch 111a corresponding thereto. In case that the on-off switch 111a corresponding to the first distribution station is turned on, only the first distribution station and the second distribution station may be connected to the center station 120, and the other distribution stations may be disconnected from the center station 120.

Next, the center station controller 122 may transmit a second determined identifier value having a value different from the first determined identifier value (S1).

The second distribution station may then receive the second determined identifier value and store the value in the distribution station memory (S2).

Next, the center station 120 may request the second distribution station to turn on the on-off switch 111a using the second determined identifier value (S3).

A distribution station controller belonging to the second distribution station may then turn on the on-off switch 111a corresponding thereto (S4).

By repeating S1 to S4, each distribution station 130 may set the determined identifier value thereof.

However, according to the conventional identifier based communication system, the determined identifier value of each distribution station 130 may be automatically assigned from the center station 120 (using an identifier setting program pre-stored in the center station). Therefore, it is difficult for a user to select the determined identifier value of the distribution station 130 as needed.

In addition, the same number of on-off switches 111a as that of distribution stations 130 needs to be installed in the common communication path 111. Therefore, the configuration of the common communication path 111 may thus become complicated.

In addition, the determined identifier value set at each distribution station 130 may not be displayed on the display thereof, and thus it may be difficult to visually confirm the determined identifier value of each distribution station 130.

Related art documents may include Korean Patent Publication No. 10-1516370 (published on Apr. 23, 2015; and entitled, "system and method for identifier allocation of multi-slave"), which discloses a technique related to the conventional identifier based communication system described above.

SUMMARY

An object of the disclosure is to provide an identifier (ID) based communication system allowing a user to easily select a determined identifier value of a distribution station as needed, having a simple configuration of a common communication path, and allowing the user to easily visually confirm the determined identifier value of each distribution station.

According to an embodiment in the disclosure, there is provided an identifier based communication system including: a common communication path; a center station having a center station communication module and a center station controller connected to the center station communication module and connected to the common communication path through the center station communication module; and a plurality of distribution stations each including a distribution station communication module connected to the common communication path, a distribution station controller connected to the distribution station communication module, and a distribution station memory connected to the distribution station controller and storing a determined identifier value of the distribution station, wherein the center station controller may transmit an identifier setting mode command including a center transmission preliminary identifier value to the distribution stations following an identifier setting request input from the outside; each of the distribution stations includes a distribution station display displaying information on the identifier value and an identifier selection key operated to select the preliminary identifier value displayed on the distribution station display as the determined identifier value of the distribution station; and wherein in a state where either a next preliminary identifier value of the setting mode or the center transmission preliminary identifier value is displayed on a corresponding distribution station display of each distribution, when a corresponding identifier selection key of each distribution station is operated to be on, the distribution station controller may store the preliminary identifier value displayed on the corresponding distribution station display in a corresponding distribution station memory of the distribution station as a determined identifier value of the setting mode of the distribution station, the distribution station controller may display the corresponding determined identifier of the setting mode on the corresponding distribution station display in a form different from the preliminary identifier value of the setting mode, the distribution station controller may store the corresponding determined identifier of the setting mode in the corresponding distribution station memory, and may then transmit to other distribution station, a next preliminary identifier value of the setting mode, which is a value increased by the number N (positive integer) from the corresponding determined identifier value of the setting mode, the distribution station controller may display the center transmission preliminary identifier value received from the center station on the corresponding distribution station display after receiving the identifier setting mode command from the center station and until the distribution station controller receives the next preliminary identifier value of the setting mode from the other distribution station, and the distribution station controller may sequentially display the next preliminary identifier value of the setting mode received from the other distribution station on the corresponding distribution station display before the corresponding determined identifier of the setting mode is stored in the corresponding distribution station memory.

Here, in order to newly set the determined identifiers at each distribution station in case that more distribution stations are established or some of the distribution stations are replaced, the center station controller may transmit an identifier modification mode command to the distribution stations following an identifier modification request input from the outside; and wherein in a state where either a next preliminary identifier value of the modification mode or a preliminary identifier value based on the pre-identifier is displayed on the corresponding distribution station display of each distribution, when the corresponding identifier selection key is operated to be on, the distribution station controller may store the identifier value displayed on the corresponding distribution station display in the corresponding distribution station memory as a determined identifier value of the modification me of each distribution station, the distribution station controller may display the corresponding determined identifier of the modification mode on the corresponding distribution station display in a form different from the preliminary identifier value of the modification mode, the distribution station controller may store the corresponding determined identifier of the modification mode in the corresponding distribution station memory, and may then transmit to other distribution station, a next preliminary identifier value of the modification mode, which has a value increased by the number N (positive integer) from the corresponding determined identifier value of the modification mode, the distribution station controller may display the preliminary identifier value based on the pre-identifier having the same value as the pre-identifier stored in the corresponding distribution station memory on the corresponding distribution station display after receiving the identifier modification mode command from the center station and until the distribution station controller receives the next preliminary identifier value of the modification mode from the other distribution station, the distribution station controller may sequentially display the next preliminary identifier value of the modification mode received from the other distribution station on the corresponding distribution station display before the corresponding determined identifier of the modification mode is stored in the corresponding distribution station memory, and the distribution station controller may store the pre-identifier stored in the corresponding distribution station memory in the corresponding distribution station memory as a corresponding determined identifier value of the modification mode in case that the corresponding identifier selection key is not operated to be on, and the distribution station does not receive another next preliminary identifier value of the modification mode within a predetermined time period after receiving the next preliminary identifier value of the modification mode from the other distribution station.

In addition, in order for the user to visually confirm the determined identifier value of the modification mode of the distribution station in which the determined identifier thereof is not modified, the distribution station controller may display the corresponding determined identifier of the modification mode on the corresponding distribution station display in a form different from the preliminary identifier value of the modification mode after the pre-identifier stored in the corresponding distribution station memory is stored in the corresponding distribution station memory as the corresponding determined identifier value of the modification mode.

DETAILED DESCRIPTION

Hereinafter, the disclosure is described in detail with reference to the accompanying drawings.

Figure 1:
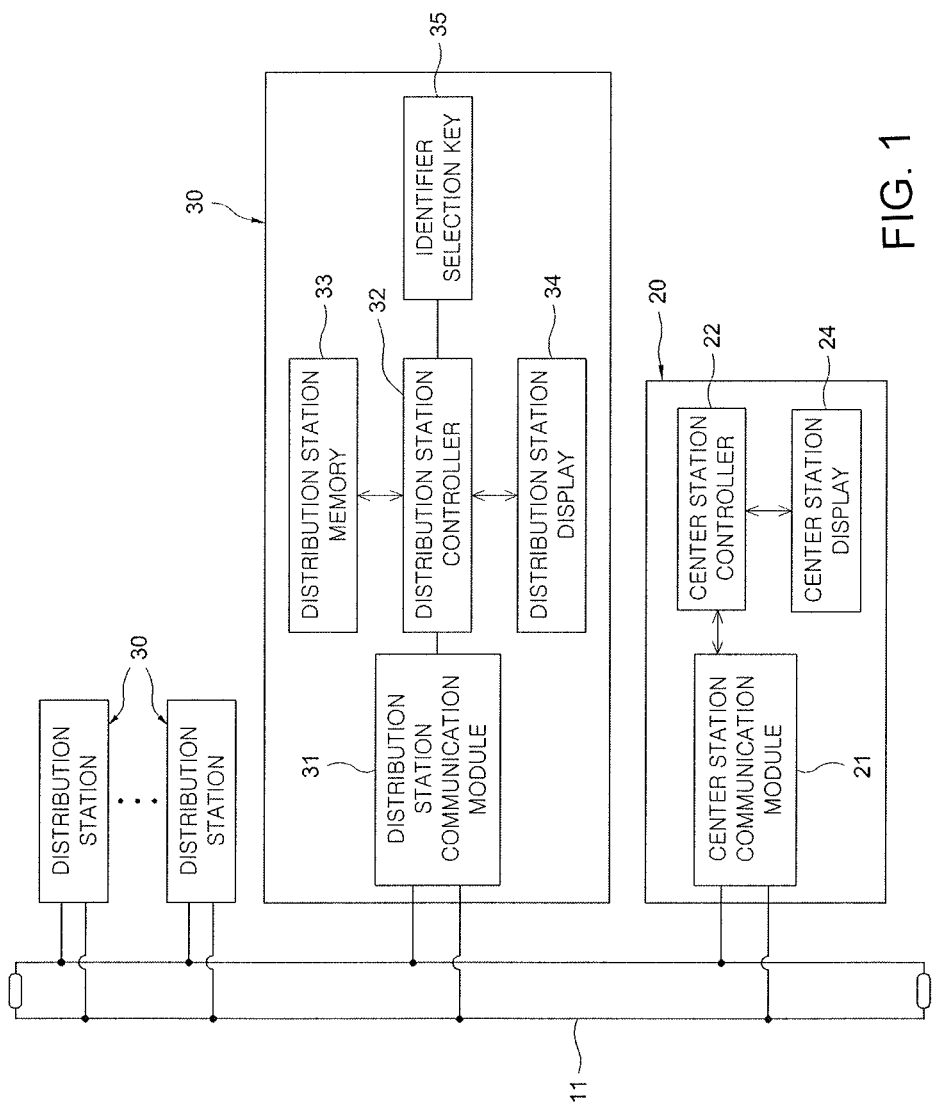
FIG. 1 is a block diagram of an identifier based communication system according to an embodiment in the disclosure.
Figure 2:
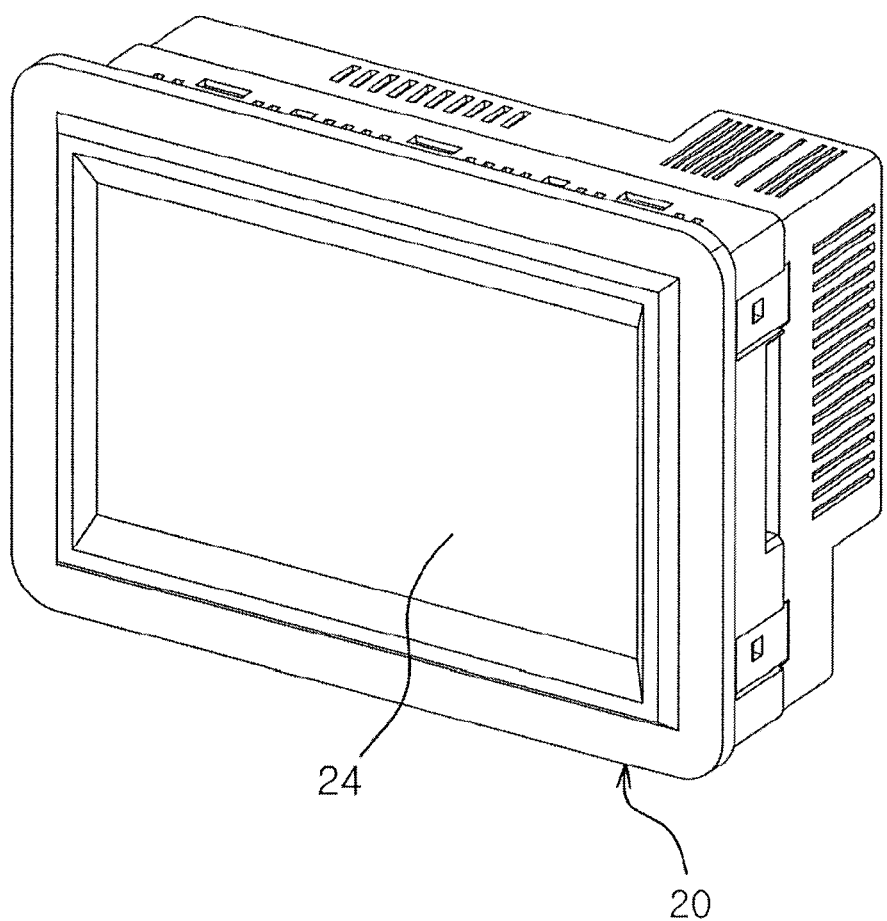
FIG. 2 is a perspective view of a center station illustrated in FIG. 1.
Figure 3:
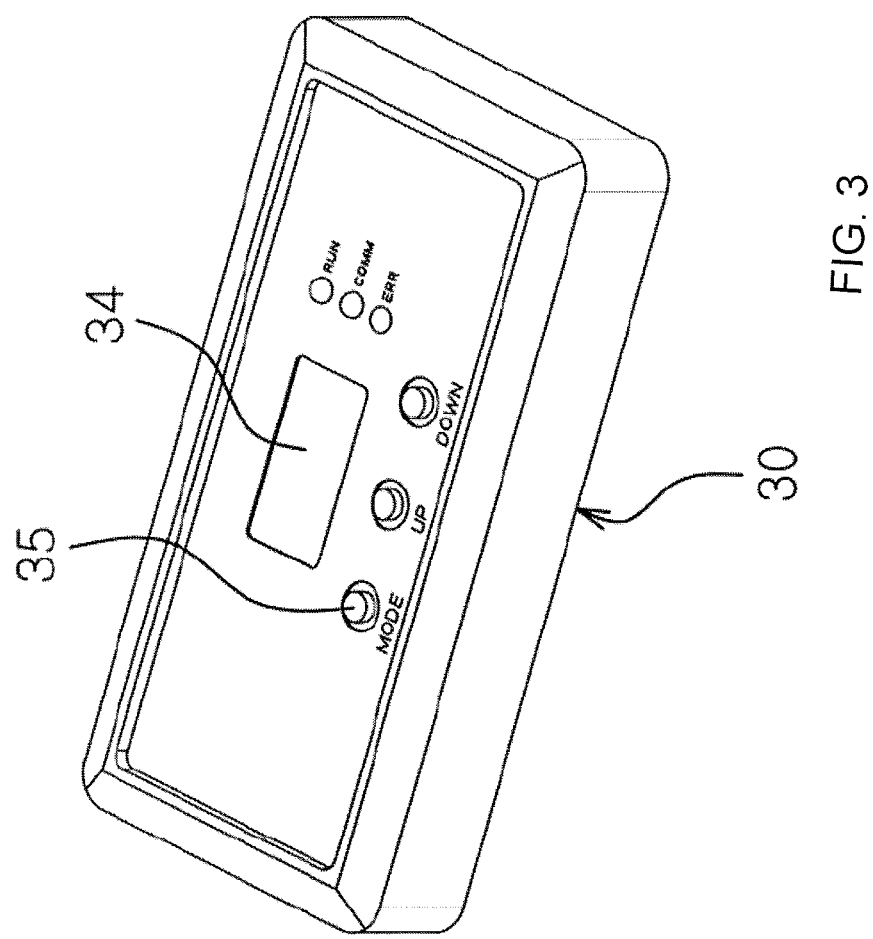
FIG. 3 is a perspective view of a distribution station illustrated in FIG. 1.
Figure 4:
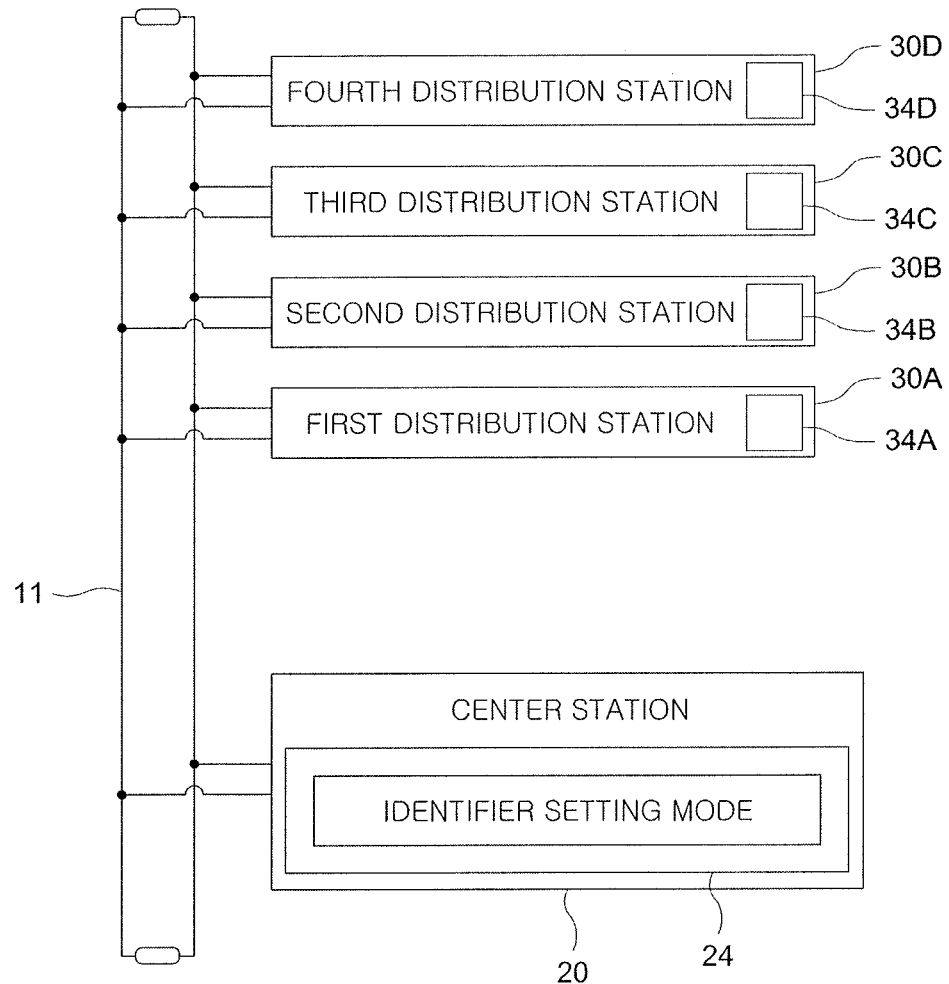
FIGS. 4 to 9 are diagrams each describing a method of setting an identifier according to an embodiment in the disclosure.

FIG. 1 is a block diagram of an identifier based communication system according to an embodiment in the disclosure, FIG. 2 is a perspective view of a center station illustrated in FIG. 1 and FIG. 3 is a perspective view of a distribution station illustrated in FIG. 1.

An identifier based communication system according to an embodiment in the disclosure, as illustrated in these drawings, may have a common communication path 11, a center station 20 and a plurality of distribution stations 30, which are connected to the common communication path 11.

The common communication path 11 may be implemented using RS 485 BUS or the like.

The center station 20 may have a center station communication module 21, a center station controller 22 connected to the center station communication module 21 and a center station display 24 connected to the center station controller 22.

The center station 20 may be connected to the common communication path 11 through the center station communication module 21.

Following a user request, the center station controller 22 may generate an identifier setting mode button for inputting an identifier setting mode command and an identifier modification mode button for inputting an identifier modification mode command, which may be then displayed on the center station display 24.

The center station controller 22 may transmit the identifier setting mode command to the distribution stations 30 in case that the identifier setting mode button is touched for operation, and transmit the identifier modification mode to the distribution stations 30 in case that the identifier modification mode button is touched for operation. The identifier setting mode command may include information on a center transmission preliminary identifier value, and the identifier modification mode command may not include the information on the center transmission preliminary identifier value.

The center station 20 and the distribution stations 30 may exchange data with each other through a master-slave communication.

Each distribution station 30 may include: a distribution station communication module 31 connected to the common communication path 11; a distribution station controller 32 connected to the distribution station communication module 31; a distribution station memory 33 connected to the distribution station controller 32 and storing a determined identifier value of the distribution station; a distribution station display 34 displaying information on the identifier value; and an identifier selection key 35 operated to select the identifier value displayed on the distribution station display 34 as the determined identifier value of the distribution station.

Each distribution station 30 may have a timer function to count time from when operating the identifier selection key 35 on. Such a timer function may be implemented using conventionally known techniques, and thus a detailed description thereof is omitted.

Each distribution station memory 33 may store a pre-identifier (a default identifier or a preset determined identifier) of the distribution station to which the memory belongs.

Each distribution station controller 32 may perform the following operations when receiving the identifier setting mode command from the center station 20.

① In a state where either a next preliminary identifier value of the setting mode or the center transmission preliminary identifier value is displayed on a corresponding distribution station display of each distribution, when a corresponding identifier selection key of each distribution station is operated to be on, the distribution station controller 32 may store the preliminary identifier value displayed on the corresponding distribution station display in a corresponding distribution station memory of the distribution station as a determined identifier value of the setting mode of the distribution station. The term "corresponding of" is used herein to indicate "belonging to" the same distribution station.

② The distribution station controller 32 may display the corresponding determined identifier of the setting mode on the corresponding distribution station display in a form different from the preliminary identifier value of the setting mode.

③ The distribution station controller 32 may store the corresponding determined identifier of the setting mode in the corresponding distribution station memory, and may then transmit to other distribution station, a next preliminary identifier value of the setting mode, which has a value increased by 1 from the corresponding determined identifier value of the setting mode, using a broadcasting method (including a code commanding all distribution stations to receive the value) or the like.

④ The distribution station controller 32 may display the center transmission preliminary identifier value received from the center station 20 on the corresponding distribution station display after receiving the identifier setting mode command from the center station 20 and until the distribution station controller 32 receives the next preliminary identifier value of the setting mode from the other distribution station.

⑤ The distribution station controller 32 may sequentially display the next preliminary identifier value of the setting mode received from the other distribution station on the corresponding distribution station display before the corresponding determined identifier of the setting mode is stored in the corresponding distribution station memory.

Each distribution station controller 32 may perform the following operations when receiving the identifier modification mode command from the center station 20.

① In a state where either a next preliminary identifier value of the modification mode or a preliminary identifier value based on the pre-identifier is displayed on the corresponding distribution station display of each distribution, when the corresponding identifier selection key is operated to be on, the distribution station controller 32 may store the preliminary identifier value of the modification mode displayed on the corresponding distribution station display in the corresponding distribution station memory as a determined identifier value of the modification mode of each distribution station.

② The distribution station controller 32 may display the corresponding determined identifier of the modification mode on the corresponding distribution station display in a form different from the preliminary identifier value of the modification mode.

③ The distribution station controller 32 may store the corresponding determined identifier of the modification mode in the corresponding distribution station memory, and may then transmit to other distribution station, a next preliminary identifier value of the modification mode, which has a value increased by 1 from the corresponding determined identifier value of the modification mode, using the broadcasting method or the like.

④ The distribution station controller 32 may display the preliminary identifier value based on the pre-identifier having the same value as the pre-identifier stored in the corresponding distribution station memory on the corresponding distribution station display until the distribution station controller 32 receives the next preliminary identifier value of the modification mode from the other distribution station.

⑤ The distribution station controller 32 may sequentially display the next preliminary identifier value of the modification mode received from the other distribution station on the corresponding distribution station display before the corresponding determined identifier of the modification mode is stored in the corresponding distribution station memory.

⑥ The distribution station controller 32 may store the pre-identifier stored in the corresponding distribution station memory in the corresponding distribution station memory as a corresponding determined identifier value of the modification mode in case that the corresponding identifier selection key is not operated to be on, and the distribution station does not receive another next preliminary identifier value of the modification mode within a predetermined time period after receiving the next preliminary identifier value of the modification mode from the other distribution station.

⑦ The distribution station controller 32 may display the corresponding determined identifier of the modification mode on the corresponding distribution station display in a form different from the preliminary identifier value of the modification mode after the pre-identifier stored in the corresponding distribution station memory is stored in the corresponding distribution station memory as the corresponding determined identifier value of the modification mode.

In addition, each distribution station controller 32 may release a state where the determined identifier value is displayed on the distribution station when a predetermined time period elapses.

The identifier selection key 35 may be implemented to be kept in an on state when pressed and in an off state when released from the pressing.

Referring to FIGS. 4 to 10, the following is an identifier setting method of the identifier based communication system according to the embodiment in the disclosure, which has the above-described configuration. For convenience of description, the distribution stations are distinguished from each other in the same manner as a first distribution station 30A, a second distribution station 30B, a third distribution station 30C and a fourth distribution station 30D in the order adjacent to the center station 20 (see FIG. 4). Here, it is assumed that each identifier selection key 35 is off and the central display 24 displays the identifier setting mode button. In addition, it is assumed that the first, second, third and fourth distribution stations 30A, 30b, 30C and 300 store a pre-identifier (default identifier) "1", respectively. It is also assumed that "1" is a center transmission preliminary identifier value included in the identifier setting mode command.

In case that the identifier setting mode button is touched (that is, an identifier setting request is input from the outside), the center station controller 22 may transmit an identifier setting mode command to the first, second, third and fourth distribution stations 30A, 30B, 30C and 30D using the broadcasting method or the like.

Figure 5:
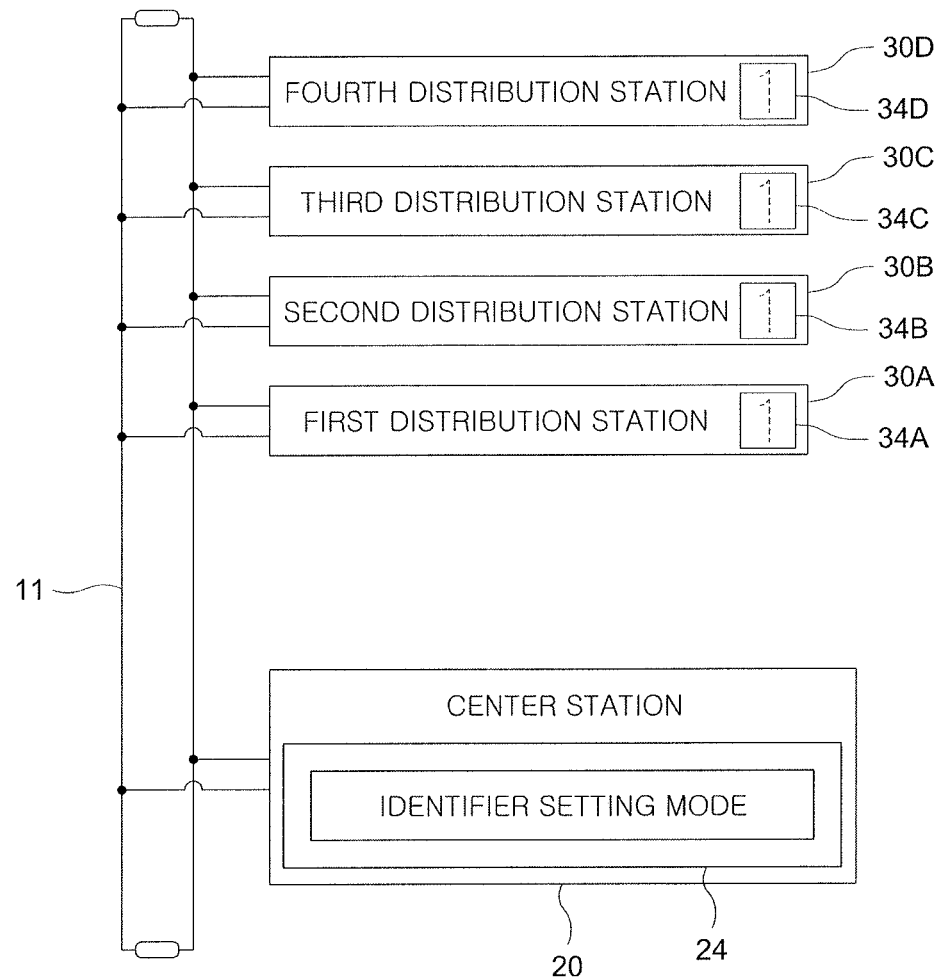

The first, second, third and fourth distribution stations 30A, 30B, 30C and 30D receiving the identifier setting mode command from the center station 20 may display the center transmission preliminary identifier value "1" on corresponding first, second, third and fourth distribution station displays 34A, 34B, 34C and 34D in a flashing manner, respectively (see FIG. 5).

Next, the user may operate a third identifier selection key (an identifier selection key belonging to the third distribution station) on. The third identifier selection key may indicate the identifier selection key belonging to the third distribution station, and the distribution station display, the distribution station controller and the distribution station memory may be indicated in the same manner.

In case that the third identifier selection key is operated to be on, a third distribution station controller may store a center transmission preliminary identifier value, which is displayed on the third distribution station display 34C, as a corresponding determined identifier value of the setting mode in a third distribution station memory. The third distribution station controller may then display the stored determined identifier value "1" of the setting mode on the third distribution station display 34C in a non-flashing manner (see FIG. 6).

Next, the third distribution station controller may transmit a next preliminary identifier value (1+1=2) of the setting mode, which has a value increased by 1 from the determined identifier value of the setting mode displayed on the third distribution station display 34C, using the broadcasting method or the like.

Figure 6:
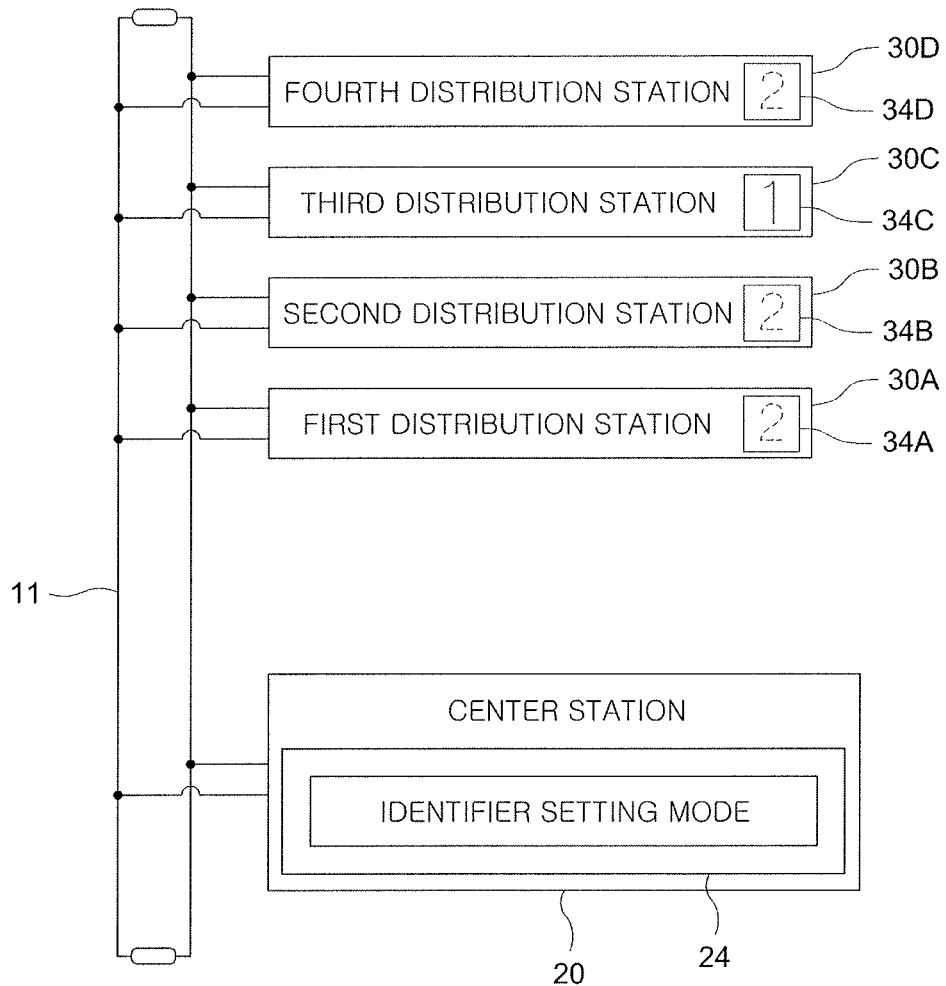

The first, second and fourth distribution stations 30A, 30B and 30D may then display the next preliminary identifier value "2" of the setting mode on the first, second and fourth distribution station displays 34A, 34B and 34*t* in a flashing manner, respectively (see FIG. 6).

Next, the user may operate a first identifier selection key on.

In case that the first identifier selection key is operated to be on, a first distribution station controller may store the next preliminary identifier value "2" of the setting mode, which is displayed on the first distribution station display 34A, as a corresponding determined identifier value of the setting mode in a first distribution station memory. The first distribution station controller may then display the stored determined identifier value "2" of the setting mode on the first distribution station display 34A in a non-flashing manner (see FIG. 7).

Next, the first distribution station controller may transmit a next preliminary identifier value (2+1=3) of the setting mode, which has a value increased by 1 from the determined identifier value of the setting mode displayed on the first distribution station display 34A, using the broadcasting method or the like.

Figure 7:
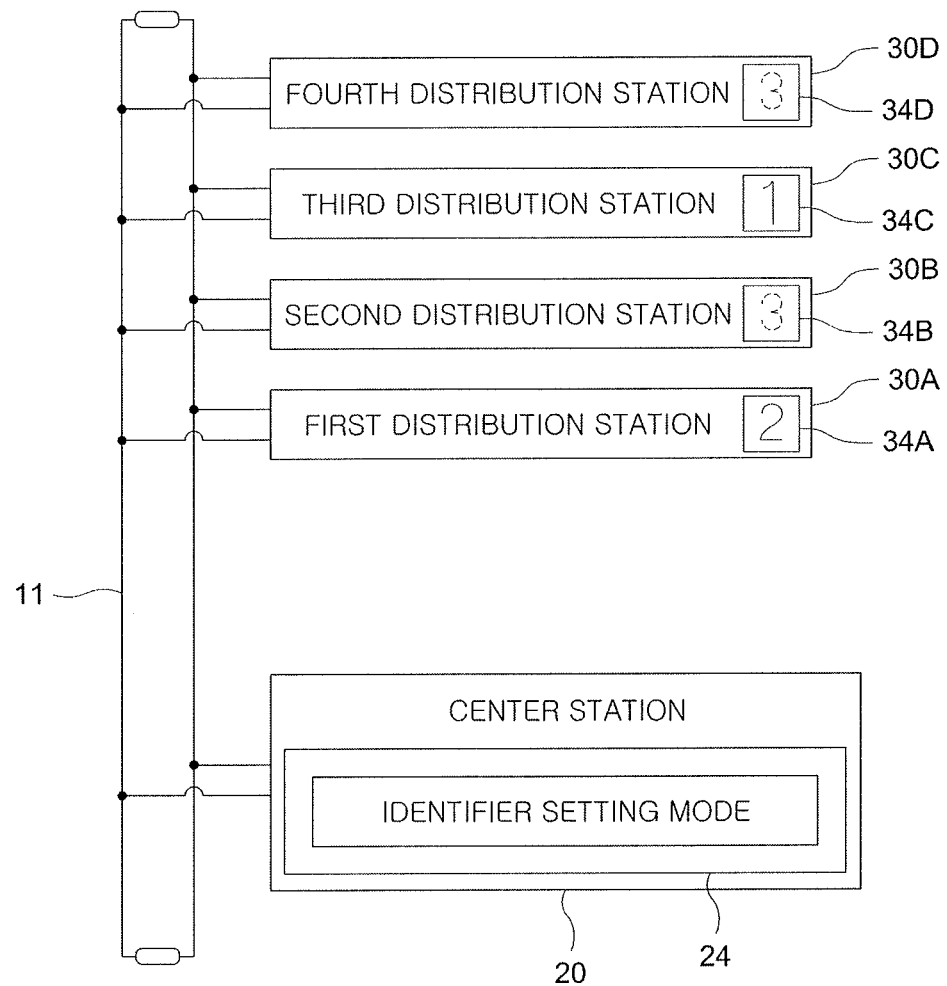

The second and fourth distribution stations 30B and 30D may then display the next preliminary identifier value "3" of the setting mode on the second and fourth distribution station displays 34B and 34D in a flashing manner, respectively (see FIG. 7).

Next, the user may operate a fourth identifier selection key on.

In case that the fourth identifier selection key is operated to be on, a fourth distribution station controller may store the next preliminary identifier value "3" of the setting mode, which is displayed on the fourth distribution station display 34D, as a corresponding determined identifier value of the setting mode in a fourth distribution station memory. The fourth distribution station controller may then display the stored determined identifier value "3" of the setting mode on the fourth distribution station display 34D in a non-flashing manner (see FIG. 8).

Next, the fourth distribution station controller may transmit a next preliminary identifier value (3+1-4) of the setting mode, which has a value increased by 1 from the determined identifier value of the setting mode displayed on the fourth distribution station display 34D, using the broadcasting method or the like.

Figure 8:
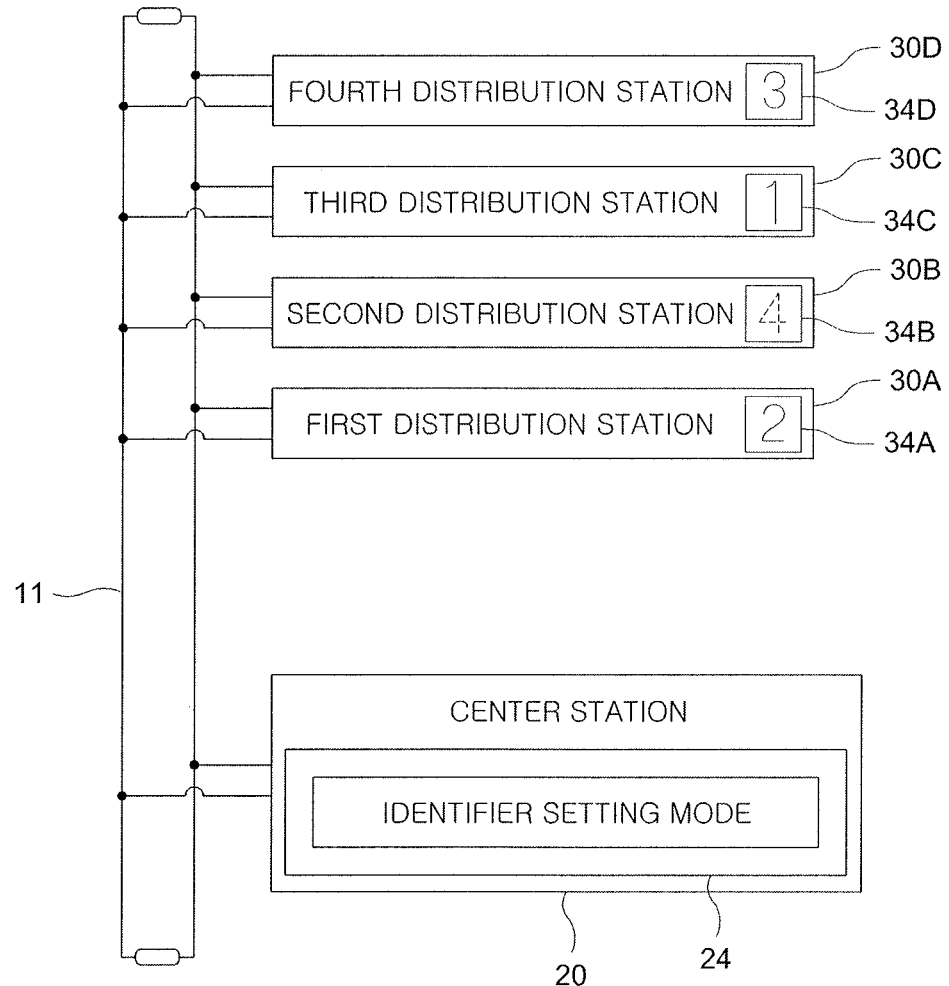
Figure 9:
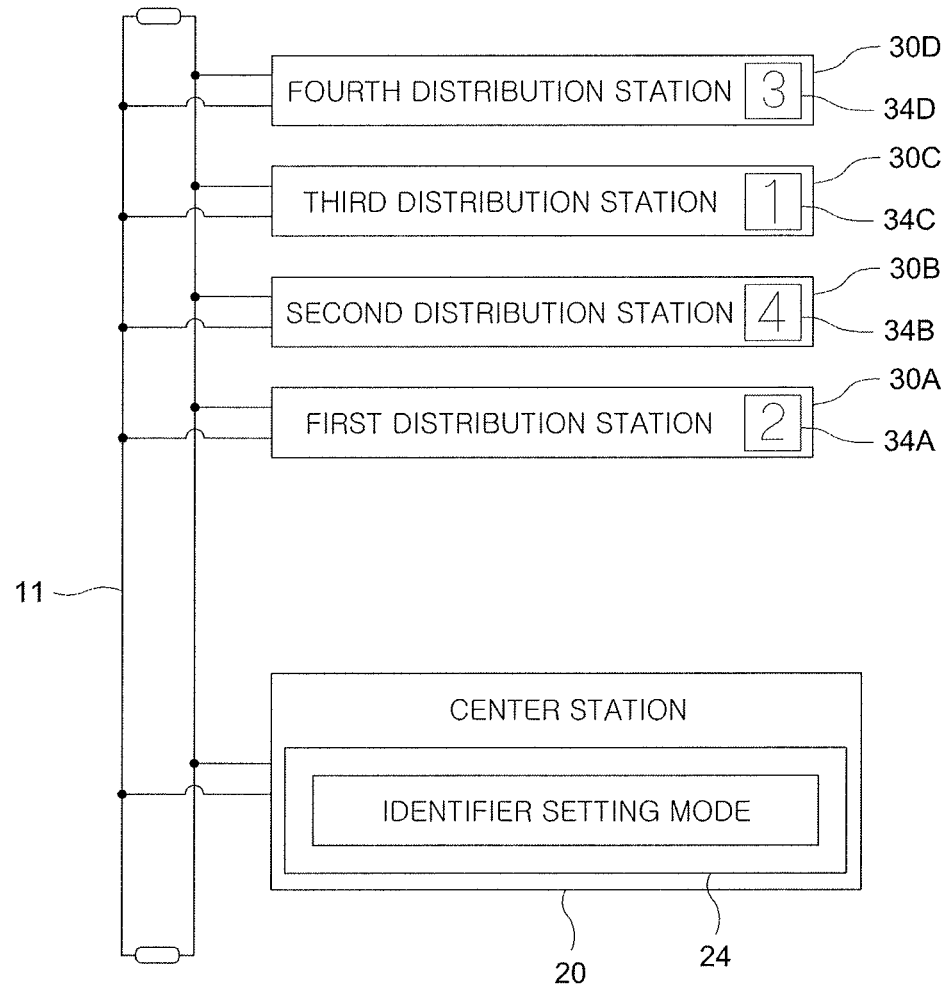
Figure 10:
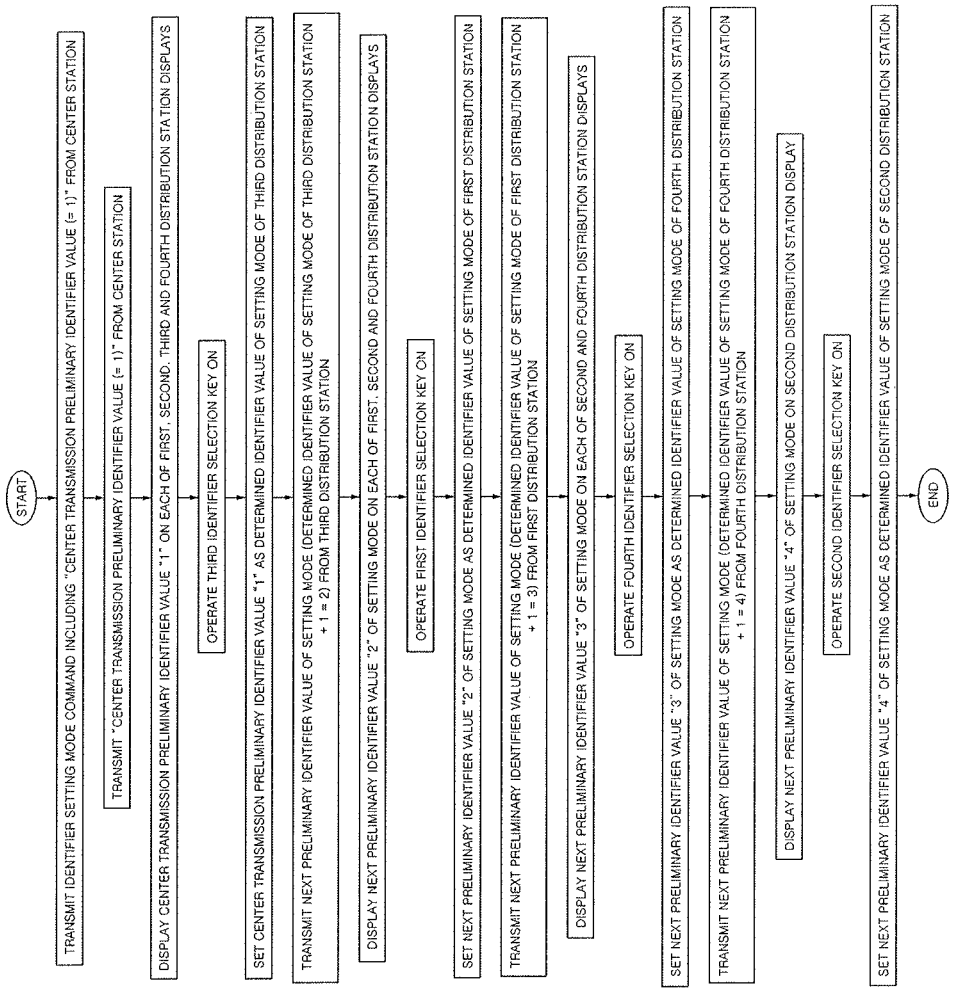
FIG. 10 is a flowchart illustrating a method of setting an identifier according to an embodiment in the disclosure.

The second distribution station 30B may then display the next preliminary identifier value "4" of the setting mode on the second distribution station display 34B in a flashing manner (see FIG. 8).

Next, the user may operate a second identifier selection key on.

In case that the second identifier selection key is operated to be on, a second distribution station controller may store the next preliminary identifier value "4" of the setting mode, which is displayed on the second distribution station display 34*b*, as a corresponding determined identifier value of the setting mode in a second distribution station memory. The second distribution station controller may then display the stored determined identifier value "4" of the setting mode on the second distribution station display 34B in a non-flashing manner (see FIG. 9).

Next, the second distribution station controller may transmit a next preliminary identifier value (4+1=5) of the setting mode, which has a value increased by 1 from the determined identifier value of the setting mode displayed on the second distribution station display 34B. However, all the other distribution stations have the determined identifiers thereof. Therefore, the next preliminary identifier value "5" of the setting mode may be displayed on none of the first, third and fourth distribution station displays 34A, 34C and 34D. In this manner, an operation to assign the determined identifiers of the setting mode to all the distribution stations may be ended. In case that the determined identifiers of the setting mode are set as above, the pre-identifiers of respective distribution stations (30A, 30B, 30C and 30D) may be ignored.

The above method of setting the determined identifiers of the setting mode may be used in case that all determined identifiers to be newly set at each distribution station are different from existing determined identifiers, as well as in case that some of the determined identifiers to be newly set are the same as the existing determined identifiers.

Referring to FIGS. 11 to 17, the following is a description of an identifier modification method of the identifier based communication system having the above-described configuration according to an embodiment in the disclosure. For convenience of description, the identifier based communication system may further have a fifth distribution station (having the pre-identifier as a default identifier value "1") and a sixth distribution station (having the pre-identifier as the default identifier value "1") (see FIG. 11). The first, second, third and fourth distribution stations may respectively have the pre-identifier; of the distribution stations (i.e. the determined identifier values of the setting mode), "2", "4", "1" and "3", in this order. Here, it is assumed that each identifier selection key 35 is off and the central display 24 displays the identifier modification mode button.

First, in case that the identifier modification mode button is touched (that is, an identifier modification request is input from the outside), the center station controller 22 may transmit an identifier modification mode command to the first, second, third, fourth, fifth and sixth distribution stations 30A, 30B, 30C, 30D, 30E and 30F.

Figure 11:
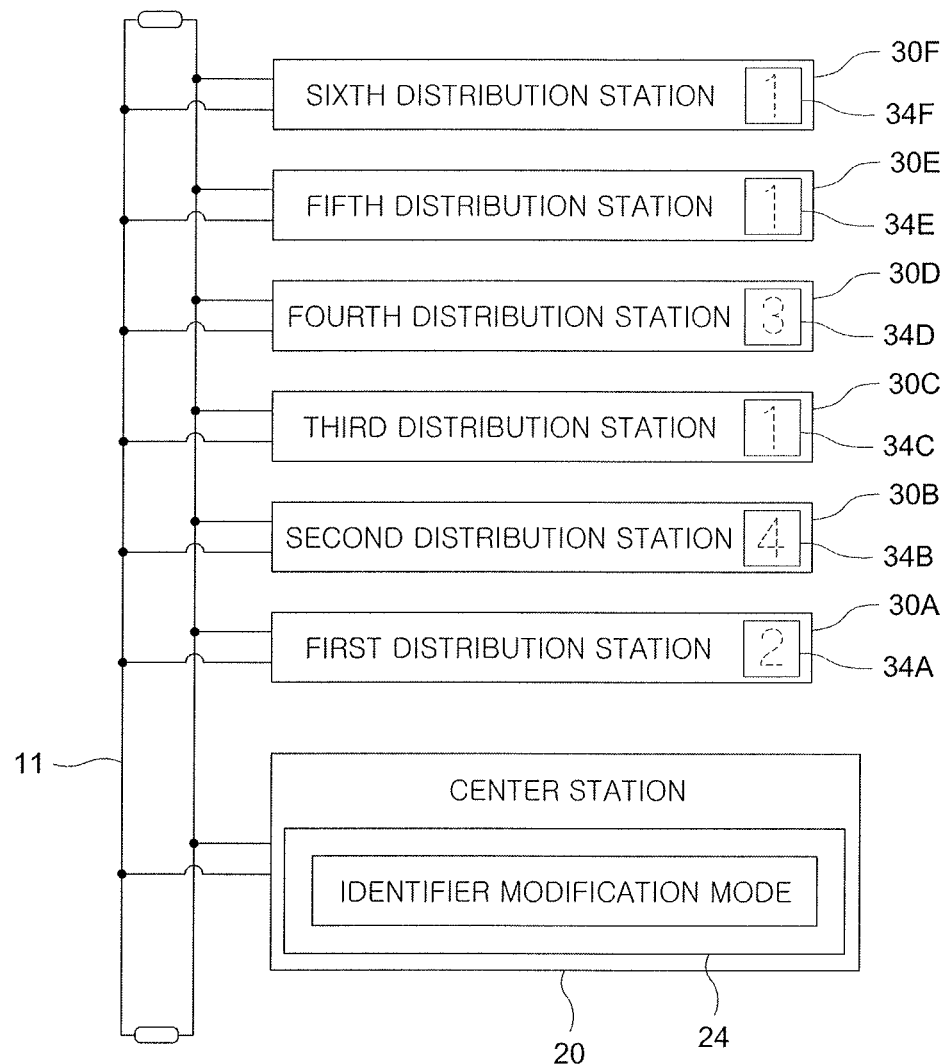
FIGS. 11 to 16 are diagrams each describing a method of modifying an identifier according to an embodiment in the disclosure.

The first, second, third, fourth, fifth and sixth distribution stations 30A, 30B, 30C, 30D, 30E and 30F receiving the identifier modification mode command from the center station 20 may then display a preliminary identifier value based on the pre-identifier which is the same value as the pre-identifier of each station on the corresponding distribution station displays 34A, 34B, 34C, 34D, 34E and 34F in a flashing manner (see FIG. 11).

Next, the user may operate the fourth identifier selection key on.

In case that the fourth identifier selection key is operated to be on, the fourth distribution station controller may store the preliminary identifier value "3" based on the pre-identifier, which is displayed on the fourth distribution station display 34D, as a corresponding determined identifier value of the modification mode in the fourth distribution station memory. The fourth distribution station controller may then display the stored determined identifier value "3" of the modification mode on the fourth distribution station display 34D in a non-flashing manner (see FIG. 12).

Next, the fourth distribution station controller may transmit a next preliminary identifier value (3+1=4) of the modification mode, which has a value increased by 1 from the determined identifier value of the modification mode.

Figure 12:
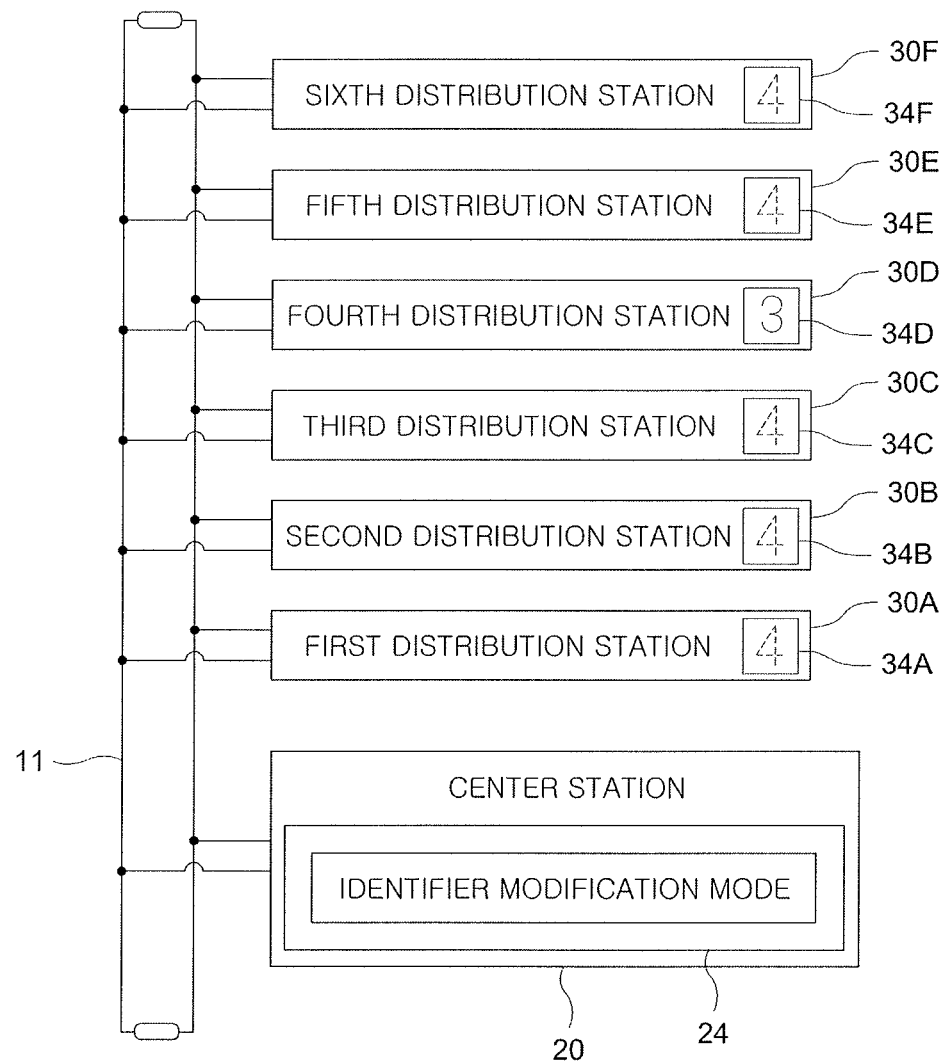

The first, second, third, fifth and sixth distribution stations 30A, 30B, 30C, 30E and 30F may then display the next preliminary identifier value "4" of the modification mode on the first, second, third, fifth and sixth distribution station displays 34A, 34B, 34C, 34E and 34F in a flashing manner, respectively (see FIG. 12).

Next, the user may operate a fifth identifier selection key on.

In case that the fifth identifier selection key is operated to be on, a fifth distribution station controller may store the preliminary identifier value "4" of the modification mode, which is displayed on the fifth distribution station display 34E, as a corresponding determined identifier value of the modification mode in a fifth distribution station memory. The fifth distribution station controller may then display the stored determined identifier value "4" of the modification mode on the fifth distribution station display 34E in a non-flashing manner (see FIG. 13).

Next, the fifth distribution station controller may transmit a next preliminary identifier value (4+1=5) of the modification mode, which has a value increased by 1 from the determined identifier value of the modification mode.

Figure 13:
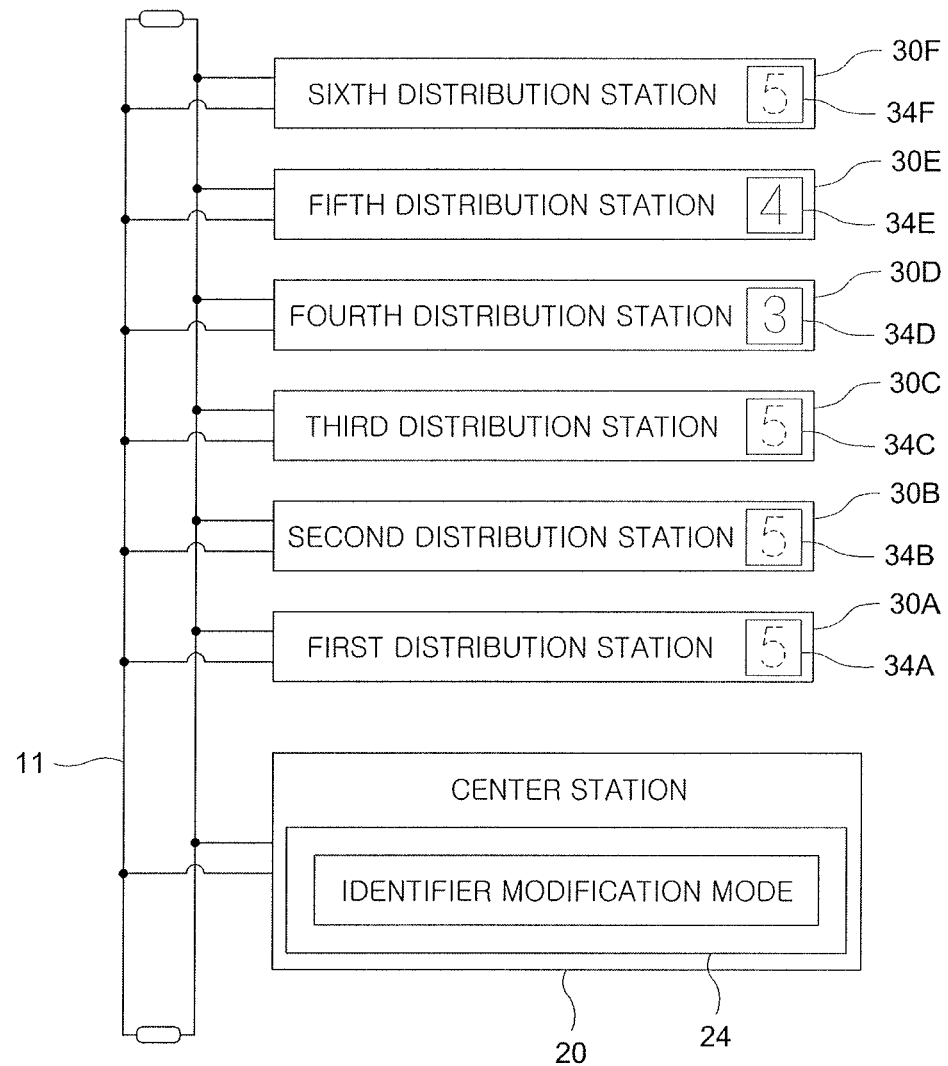

The first, second, third and sixth distribution stations 30A, 30B, 30C and 30F may then display the next preliminary identifier value "5" of the modification mode on the first, second, third and sixth distribution station displays 34A, 348, 34C and 34F in a flashing manner, respectively (see FIG. 13).

Next, the user may operate the second identifier selection key on.

In case that the second identifier selection key is operated to be on, the second distribution station controller may store the preliminary identifier value "5" of the modification mode, which is displayed on the second distribution station display 34B, as a corresponding determined identifier value of the modification mode in the second distribution station memory. The second distribution station controller may then display the stored determined identifier value "5" of the modification mode on the second distribution station display 34B in a non-flashing manner (see FIG. 14).

Next, the second distribution station controller may transmit a next preliminary identifier value (5+1=6) of the modification mode, which has a value increased by 1 from the determined identifier value of the modification mode.

Figure 14:
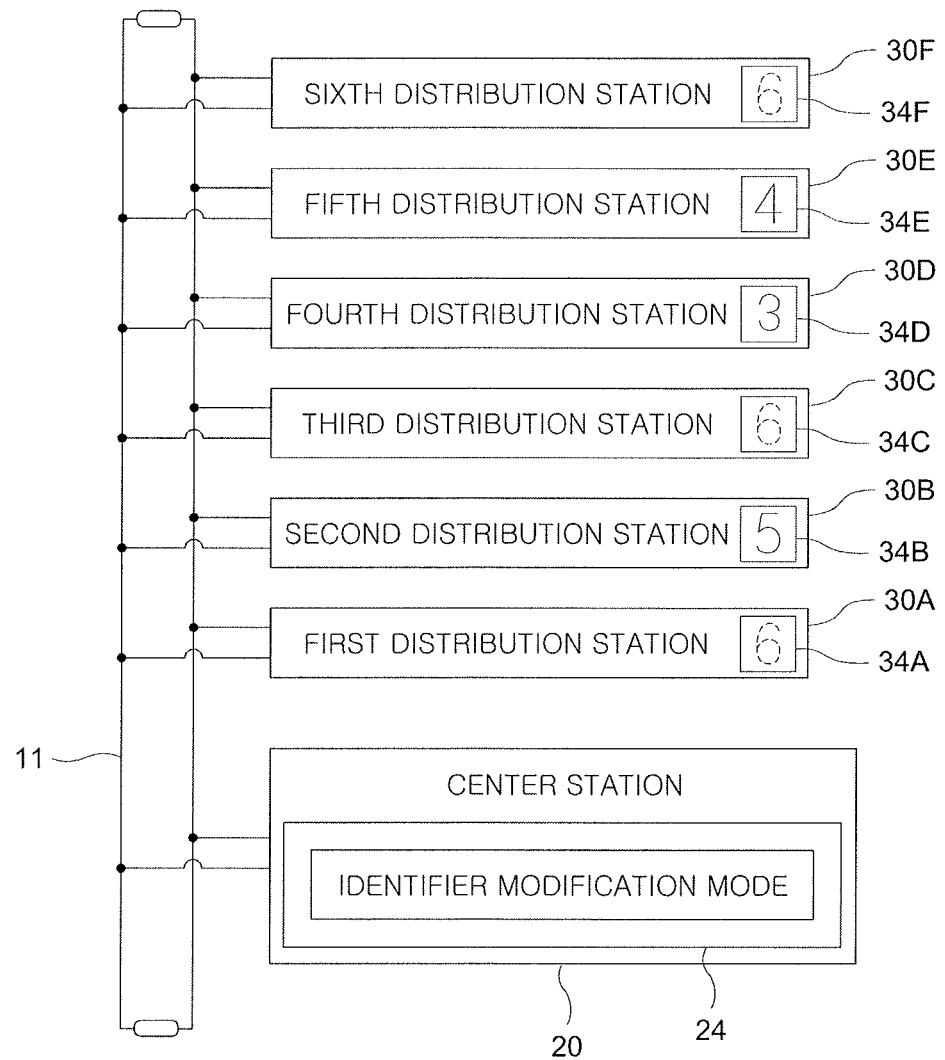

The first, third and sixth distribution stations 30A, 30C and 30F may then display the next preliminary identifier value "6" of the modification mode on the first, third and sixth distribution station displays 34A, 34C and 34F in a flashing manner, respectively (see FIG. 14).

Next, the user may operate a sixth identifier selection key on.

In case that the sixth identifier selection key is operated to be on, a sixth distribution station controller may store the next preliminary identifier value "6" of the modification mode, which is displayed on the sixth distribution display 34F, as a corresponding determined identifier value of the modification mode in a sixth distribution station memory. The sixth distribution station controller may then display the stored determined identifier value "6" of the modification mode on the sixth distribution station display 34F in a non-flashing manner (see FIG. 15).

Next, the sixth distribution station controller may transmit a next preliminary identifier value (6+1 a 7) of the modification mode, which has a value increased by 1 from the determined identifier value of the modification mode.

Figure 15:
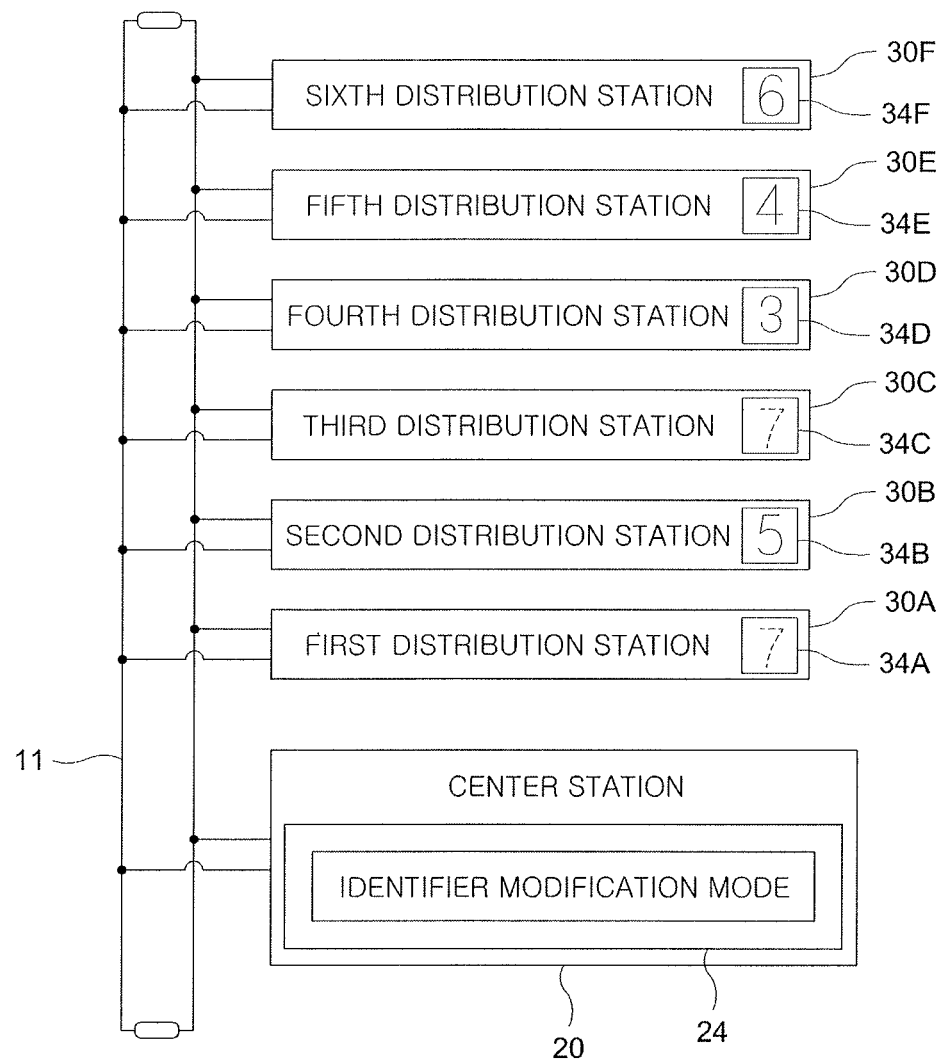
Figure 16:
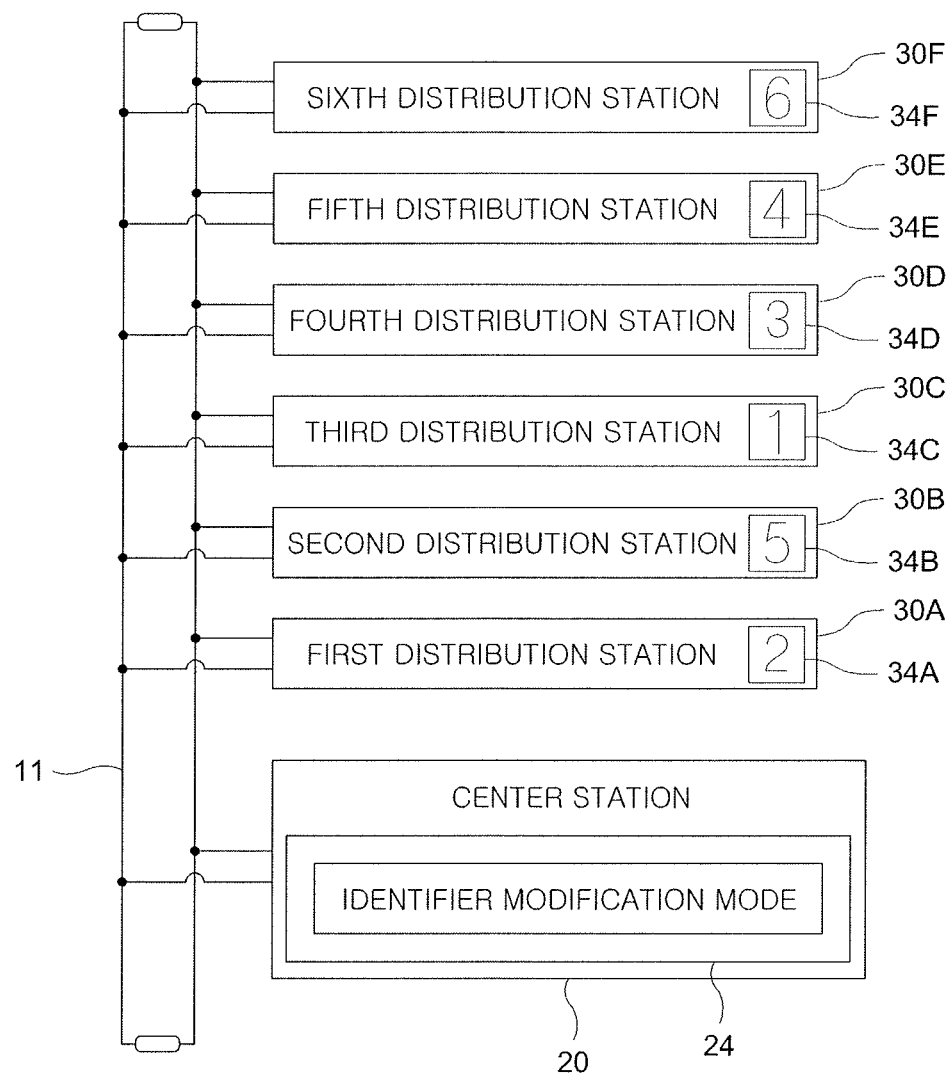
Figure 17:
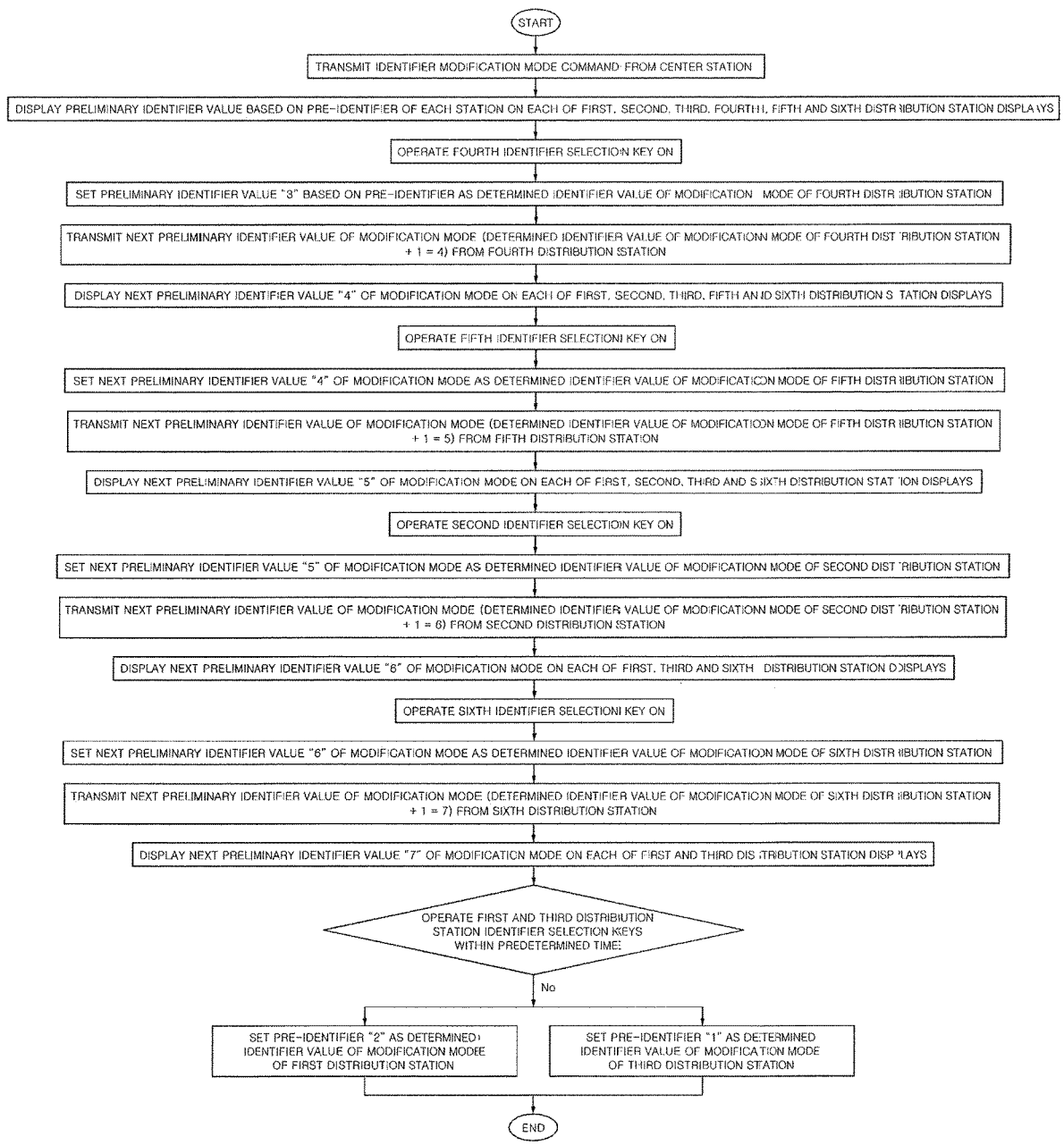
FIG. 17 is a flowchart illustrating a method of modifying an identifier according to an embodiment in the disclosure.
Figure 18:
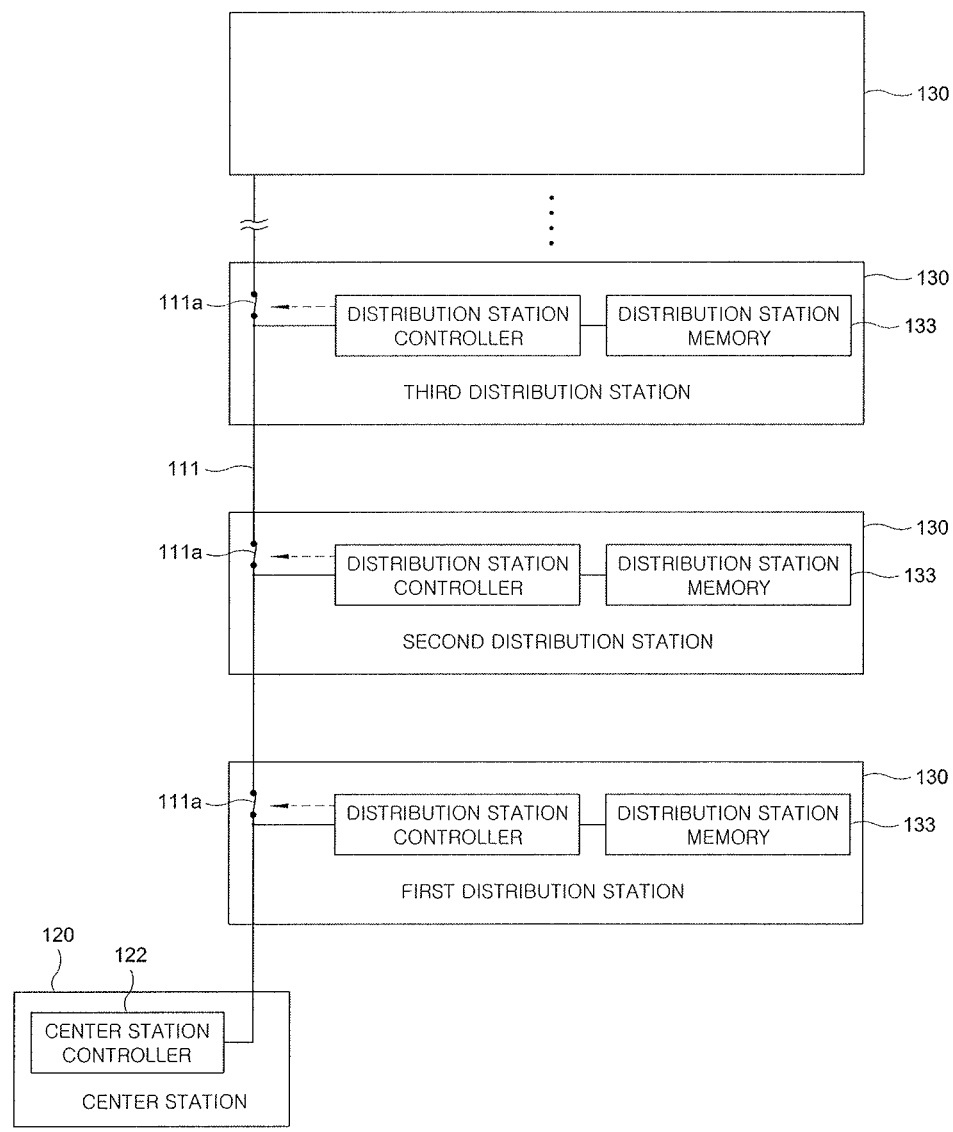
FIG. 18 is a block diagram of a conventional identifier based communication system.
Figure 19:
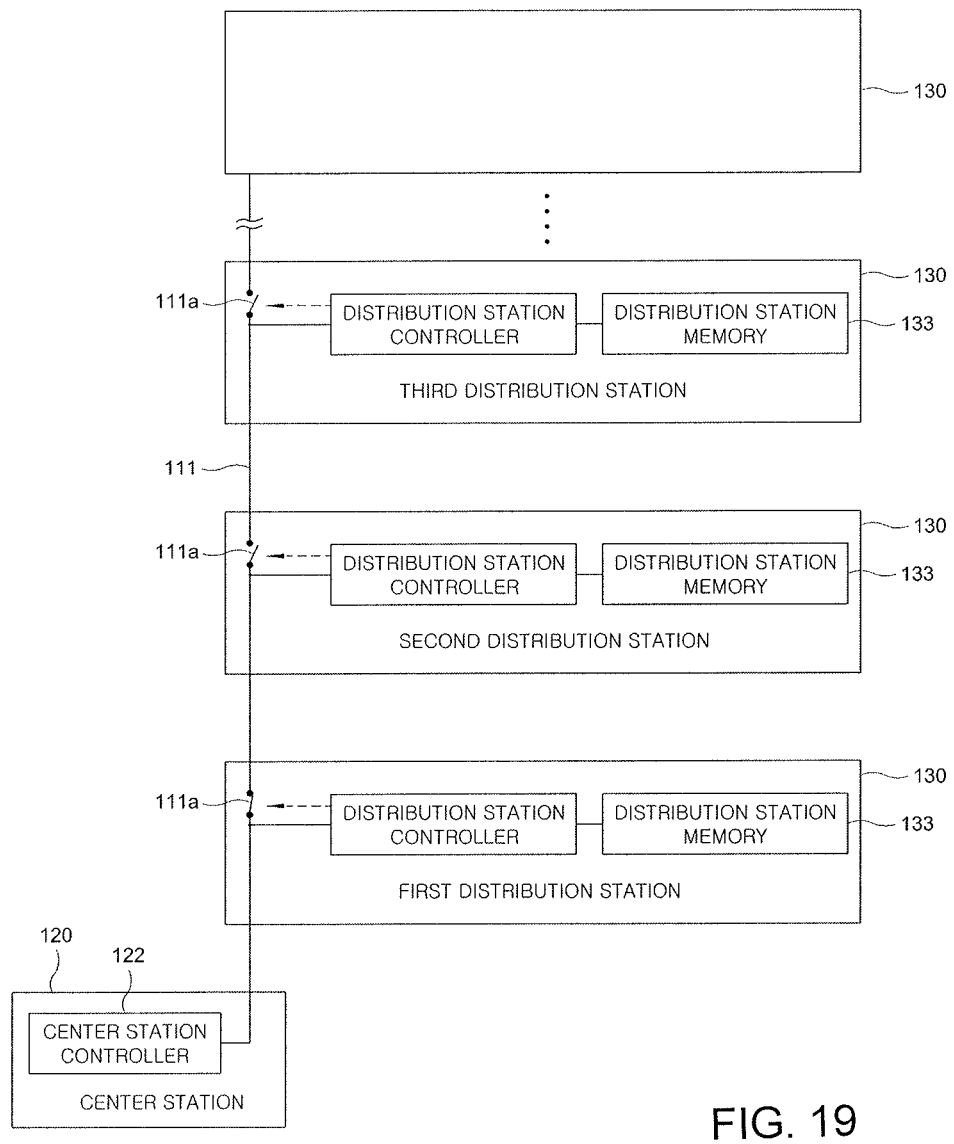
FIG. 19 is a diagram describing a method of setting an identifier according to a conventional identifier based communication system.

Next, the first distribution station controller may display the next preliminary identifier value "7" of the modification mode on the first distribution station display 34A in a flashing manner, and the third distribution station controller may display the next preliminary identifier value "7" of the modification mode on the third distribution station display 34C in a flashing manner (see FIG. 15).

Next, in case that the user does not operate the first and third distribution station identifier selection keys for a pre-determined time, none of the first and third distribution stations 30A and 30C may receive another next preliminary identifier value of the modification mode.

In case of not receiving another next preliminary identifier value of the modification mode, the first distribution station controller may store the pre-identifier "2" stored in the first distribution station memory in the first distribution station memory as a corresponding determined identifier value of the modification mode. The first distribution station controller may then display the stored determined identifier value "2" of the modification mode on the first distribution station display 34A in a non-flashing manner (see FIG. 16).

In addition, in case of not receiving another next preliminary identifier value of the modification mode, the third distribution station controller may store the pre-identifier "1" stored in the third distribution station memory in the third distribution station memory as a corresponding determined identifier value of the modification mode. The third distribution station controller may then display the stored determined identifier value "1" of the modification mode on the third distribution station display 34C in a non-flashing manner (see FIG. 16).

The above method of setting the determined identifiers of the modification mode may be used in case that more distribution stations are established or at least one of the distribution stations are replaced after being operated in a normal mode, and simultaneously, some of the determined identifiers to be newly set at each distribution station are the same as the existing determined identifiers.

Meanwhile, in the above-described embodiment in the disclosure, an identifier assignment interval is set to "1". However, it is possible to set a different identifier interval such as "2" and "3".

In addition, the disclosure may disclose another embodiment different from the above-described embodiment, in which a distribution station 30 may transmit a corresponding determined identifier value to a center station 20 and setting of an identifier value for each distribution station 30 may be displayed on a center station display 24 based on the determined identifier value received from the distribution station 30.

According to an embodiment in the disclosure as described above, each distribution station controller 32 may allow the preliminary identifier value of the setting mode (either the center transmission preliminary identifier value transmitted from the center station or the next preliminary identifier value of the setting mode transmitted from other distribution station) to be commonly displayed on each distribution station display belonging to each distribution station which is yet to set the corresponding determined identifier value of the setting mode. Next, the identifier selection key 35 belonging to the distribution station 30 which is to set the determined identifier of the modification mode may be operated to be on. Using this method, the displayed preliminary identifier value of the setting mode may be set as the determined identifier of the setting mode of the corresponding distribution station of the operated identifier selection key 35. The distribution station 30 having the determined identifier of the setting mode may then transmit to other distribution station, the next preliminary identifier value of the setting mode, which has a value increased by the number N (positive integer) from the corresponding determined identifier of the setting mode. In this manner, the identifier (ID) based communication system in the disclosure ray allow the user to easily select the determined identifier value of the distribution station as needed, have a simple configuration of the common communication path, and allow the user to easily visually confirm the determined identifier value of each distribution station.

In addition, each distribution station controller 32 may allow the preliminary identifier value of the modification mode (either the preliminary identifier value based on the pre-Identifier, which is the same value as the pre-identifier of the distribution station or the next preliminary identifier value of the modification mode transmitted from other distribution station) to be commonly displayed on each distribution station display 34 belonging to each distribution station which is yet to set the corresponding determined identifier value of the modification mode. Next, the identifier selection key 35 belonging to the distribution station 30 which is to set the determined identifier of the modification mode may be operated to be on. Using this method, the displayed preliminary identifier value of the modification mode may be set as the determined identifier of the modification mode of the corresponding distribution station of the operated identifier selection key 35. The distribution station 30 having the determined identifier of the modification mode may then transmit to other distribution station, the next preliminary identifier value of the modification mode, which has a value increased by the number N (positive integer) from the corresponding determined identifier of the modification mode. In case that the corresponding identifier selection key is not operated to be on, and the distribution station does not receive another next preliminary identifier value of the modification mode within a predetermined time period after receiving the next preliminary identifier value of the modification mode from the other distribution station, the pre-identifier stored in the corresponding distribution station memory may be set as a corresponding determined identifier value of the modification mode. In this manner, the determined identifiers may be newly set at each distribution station in case that more distribution stations 30 are established or some of the distribution stations are replaced.

In addition, after the corresponding distribution station memory stores the pre-identifier stored therein as the corresponding determined identifier value of the modification mode, the corresponding distribution station display may display the corresponding determined identifier of the modification mode in a form different from the preliminary identifier value of the modification mode. In this manner, the user may visually confirm the determined identifier value of the modification mode of the distribution station in which the determined identifier thereof is not modified.

What is claimed is:

1. An identifier based communication system comprising:
    a common communication path;
    a center station having a center station communication module and a center station controller connected to the center station communication module and connected to the common communication path through the center station communication module; and
    a plurality of distribution stations each including a distribution station communication module connected to the common communication path, a distribution station controller connected to the distribution station communication module, and a distribution station memory connected to the distribution station controller and storing a determined identifier value of the distribution station,
    wherein the center station controller transmits an identifier setting mode command including a center transmission preliminary identifier value to the distribution stations following an identifier setting request input from outside;
    each of the distribution stations includes a distribution station display displaying information on the preliminary identifier value and an identifier selection key operated to select the preliminary identifier value displayed on the distribution station display as the determined identifier value of the distribution station; and
    wherein in a state where either a next preliminary identifier value of a setting mode or the center transmission preliminary identifier value is displayed on a corresponding distribution station display of each distribution station, when a corresponding identifier selection key of each distribution station is operated to be on, the distribution station controller stores the preliminary identifier value displayed on the corresponding distribution station display in a corresponding distribution station memory of the distribution station as a determined identifier value of the setting mode of the distribution station,
    the distribution station controller displays the corresponding determined identifier value of the setting mode on the corresponding distribution station display in a form different from the preliminary identifier value of the setting mode,
    the distribution station controller stores the corresponding determined identifier value of the setting mode in the corresponding distribution station memory, and then transmits to other distribution station, a next preliminary identifier value of the setting mode, which is a value increased by a number N (positive integer) from the corresponding determined identifier value of the setting mode,
    the distribution station controller displays the center transmission preliminary identifier value received from the center station on the corresponding distribution station display after receiving the identifier setting mode command from the center station and until the distribution station controller receives the next preliminary identifier value of the setting mode from the other distribution station, and
    the distribution station controller sequentially displays the next preliminary identifier value of the setting mode received from the other distribution station on the corresponding distribution station display before the corresponding determined identifier value of the setting mode is stored in the corresponding distribution station memory.

2. The identifier based communication system of claim 1,
    wherein the center station controller transmits an identifier modification mode command to the distribution stations following an identifier modification request input from the outside; and
    wherein in a state where either a next preliminary identifier value of a modification mode or a preliminary identifier value based on a pre-identifier is displayed on the corresponding distribution station display of each distribution station, when the corresponding identifier selection key is operated to be on, the distribution station controller stores the preliminary identifier value of the modification mode or the preliminary identifier value based on the pre-identifier displayed on the corresponding distribution station display in the corresponding distribution station memory as a determined identifier value of the modification mode of each distribution station,
    the distribution station controller displays the corresponding determined identifier value of the modification mode on the corresponding distribution station display in a form different from the preliminary identifier value of the modification mode, the distribution station controller stores the corresponding determined identifier value of the modification mode in the corresponding distribution station memory, and then transmits to other distribution station, a next preliminary identifier value of the modification mode, which has a value increased by the number N (positive integer) from the corresponding determined identifier value of the modification mode, the distribution station controller displays the preliminary identifier value based on another pre-identifier having the same value as the pre-identifier stored in the corresponding distribution station memory on the corresponding distribution station display after receiving the identifier modification mode command from the center station and until the distribution station controller receives the next preliminary identifier value of the modification mode from the other distribution station, the distribution station controller sequentially displays the next preliminary identifier value of the modification mode received from the other distribution station on the corresponding distribution station display before the corresponding determined identifier value of the modification mode is stored in the corresponding distribution station memory, and the distribution station controller stores the pre-identifier stored in the corresponding distribution station memory in the corresponding distribution station memory as a corresponding determined identifier value of the modification mode in case that the corresponding identifier selection key is not operated to be on, and the distribution station does not receive another next preliminary identifier value of the modification mode within a predetermined time period after receiving the next preliminary identifier value of the modification mode from the other distribution station.

3. The identifier based communication system of claim 2, wherein the distribution station controller displays the corresponding determined identifier value of the modification mode on the corresponding distribution station display in a form different from the preliminary identifier value of the modification mode after the pre-identifier stored in the corresponding distribution station memory is stored in the corresponding distribution station memory as the corresponding determined identifier value of the modification mode.

* * * * *